(12) United States Patent
Haugsjaahabink

(10) Patent No.: US 9,140,191 B2
(45) Date of Patent: Sep. 22, 2015

(54) SYSTEM FOR CONTROLLING TWO POSITIVE DISPLACEMENT PUMPS

(71) Applicant: Hamilton Sundstrand Corporation, Windsor Locks, CT (US)

(72) Inventor: Todd Haugsjaahabink, Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 212 days.

(21) Appl. No.: 13/867,627

(22) Filed: Apr. 22, 2013

(65) Prior Publication Data
US 2014/0311599 A1    Oct. 23, 2014

(51) Int. Cl.
*F02C 7/236* (2006.01)
*F02C 9/30* (2006.01)
*F15B 11/17* (2006.01)
*F02D 1/02* (2006.01)
*F02C 9/26* (2006.01)
*F02C 7/22* (2006.01)

(52) U.S. Cl.
CPC . *F02C 7/236* (2013.01); *F02C 7/22* (2013.01); *F02C 9/263* (2013.01); *F02C 9/30* (2013.01); *F02D 1/02* (2013.01); *F15B 2211/20584* (2013.01); *F15B 2211/20592* (2013.01); *F15B 2211/611* (2013.01); *Y10T 137/85986* (2015.04)

(58) Field of Classification Search
CPC ............ F02C 7/236; F02C 9/263; F02C 9/30; F15B 2211/20584; F15B 2211/20592; F15B 2211/611; Y10T 137/86171

USPC ................... 137/565.35; 60/39.281, 443, 444
See application file for complete search history.

(56) References Cited

U.S. PATENT DOCUMENTS

| | | | |
|---|---|---|---|
| 3,332,234 A * | 7/1967 | Lavash ...................... 60/39.281 |
| 6,651,441 B2 | 11/2003 | Reuter et al. |
| 2010/0089026 A1 | 4/2010 | Baker et al. |
| 2012/0156061 A1 | 6/2012 | Baker et al. |
| 2012/0234014 A1 | 9/2012 | Reuter et al. |
| 2012/0234015 A1 | 9/2012 | Reuter |
| 2012/0266600 A1 | 10/2012 | Bader et al. |
| 2012/0315152 A1 * | 12/2012 | Baker ............................. 417/53 |

OTHER PUBLICATIONS

European Patent Office, European Search Report, Mar. 24, 2015, 5 pages.

\* cited by examiner

*Primary Examiner* — Atif Chaudry
(74) *Attorney, Agent, or Firm* — Kinney & Lange, P.A.

(57) ABSTRACT

A fuel system, such as for use in an aircraft, comprises a main pump, a servo pump, a modulating valve, a shut-off valve, an actuator and a pump sharing valve. The main pump and the servo pump receive fuel from a source. The metering valve receives main flow from the main pump. The shut-off valve receives fuel flow from the metering valve. The actuator receives fuel flow from the servo pump. The pump sharing valve receives circulating flow from the servo pump and alternatively directs shared flow to the main flow or an inlet of the servo pump. The pump sharing valve also sends main pump flow to supplement the servo pump during shutdown conditions.

12 Claims, 2 Drawing Sheets

SYSTEM FOR CONTROLLING TWO POSITIVE DISPLACEMENT PUMPS

BACKGROUND

The present disclosure relates generally to fuel systems for gas turbine engines. In particular, the present disclosure relates to fuel systems utilizing fuel flow from two fuel pumps to provide combustion fuel and to operate engine actuation systems.

In conventional fuel systems, a main fuel pump is used to deliver fuel to a fuel metering valve that provides fuel directly to fuel injectors in the combustion section of a gas turbine engine. Additionally, some of the fuel flow from the main fuel pump is circulated through actuators that operate other engine or aircraft systems. Such a system is described in U.S. Pat. No. 4,487,016, which is assigned to United Technologies Corporation. In some systems, the metering valve is controlled with a servo valve-controlled torque motor that provides fuel based on engine requirements for different speeds, and servo valve-controlled actuators are used to regulate airflow to active clearance control systems based on the fuel flow. The servo valves utilize fuel flow from the main fuel pump to provide actuation. The main fuel pump needs to be sized at a minimum to provide flow to the servo valves and to the injectors at start and idle engine speed, and at a maximum to provide flow to the servo valves and to the injectors under transient engine conditions, such as during take-off. Thus, the main fuel pump must have a large capacity to accommodate the entire engine operating envelope and to provide fuel to other various aircraft systems.

More recent systems have utilized a dedicated servo pump to service the actuators in order to reduce inefficiencies of a large main fuel pump. Additionally, it is desirable to ensure that the dedicated servo pump generates enough flow and pressure to ensure operation of the actuators in the event of an engine shutdown. One dual-pump system is described in Pub. No. U.S. 2012/0234015, which is assigned to Hamilton Sundstrand Corporation. This system, however, relies on a pressure regulating valve that has multiple windows controlling multiple fuel flows with a single spool. There is need for a more efficient and more easily controlled fuel and actuation system for gas turbine engines.

SUMMARY

The present disclosure is directed to a fuel system, such as for an aircraft. The fuel system comprises a main pump, a servo pump, a metering valve, a shut-off valve, an actuator and a pump sharing valve. The main pump and the servo pump receive fuel from a source. The metering valve receives main flow from the main pump. The shut-off valve receives fuel flow from the metering valve. The actuator receives fuel flow from the servo pump. The pump sharing valve receives circulating flow from the servo pump and alternatively directs shared flow to the main flow or an inlet of the servo pump. The pump sharing valve also sends main pump flow to supplement the servo pump during shutdown conditions.

DETAILED DESCRIPTION

Figure 1A:
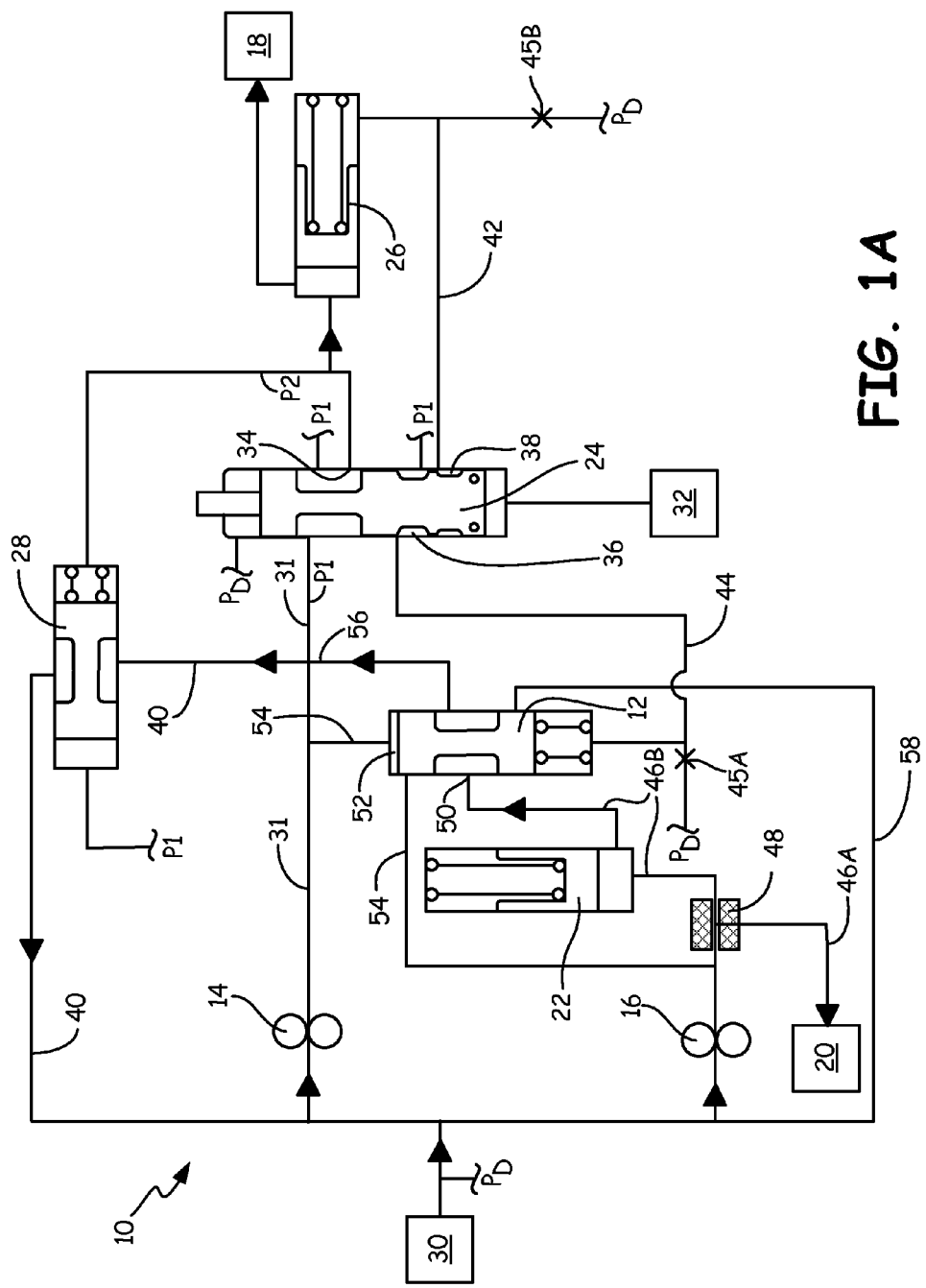
FIG. 1A shows a fuel and actuation system in a run mode wherein a pump sharing valve regulates flow from a main fuel pump and a servo fuel pump to a combustion system and to actuators.

FIG. 1A shows fuel and actuation system 10 in a run mode wherein pump sharing valve 12 regulates flow from main pump 14 and servo pump 16 to nozzles 18 and to actuators 20. System 10 also includes minimum pressure valve 22, metering valve 24, shut-off valve 26 and pressure regulating valve 28. System 10 is provided with fuel from source 30, which may be a fuel tank located on an aircraft airframe, or a boost pump that receives fuel from a fuel tank. The present disclosure is described with reference to a fuel system for a gas turbine engine that utilizes fuel flow to operate aircraft system actuators. However, the fuel and actuation system described herein may be used with other aircraft or non-aircraft systems.

Fuel located in source 30 is pumped out at pressure PD, such as through the use of a boost pump (not shown) to main pump 14 and servo pump 16. Main pump 14 delivers fuel to nozzles 18 within a gas turbine engine combustor where a combustion process that consumes fuel occurs. Servo pump 16 provides fuel to actuators 20 to control various operations related to the gas turbine engine, and then returns the fuel to system 10. Main pump 14 and servo pump 16 are mechanically operated based on shaft speed within the gas turbine engine to which they are coupled. Thus, at higher shaft speeds, pumps 14 and 16 provide higher volumetric flow rates of fuel. Fuel flow from each of main pump 14 and servo pump 16 can be used to compliment flow from the other pump in various operating states of system 10. For example, servo pump 16 can boost output of main pump 14 during normal engine operating conditions (e.g. during high fuel demand conditions), while main pump 14 can boost output of servo pump 16 during engine shut down conditions (e.g. during low fuel demand conditions).

A main flow of fuel from main pump 14 flows to metering valve 24 through main line 31 at pressure P1. Metering valve 24 is actively controlled by a FADEC or EEC that operates servo motor 32. Metering valve 24 includes main window 34, unloading port 36 and shut-off port 38. In the run mode, fuel that passes through window 34 of metering valve 24 is controlled by pressure regulating valve 28. From metering valve 24, fuel passes through shut-off valve 26 to engine nozzles 18. Shut-off valve 26 is spring-biased to a shut or closed position, but is held open in the run mode via pressure P2 from metering valve 24. Nozzles 18 provide fuel to a combustor within a gas turbine engine where a combustion process is executed that consumes the fuel. The combustion process, as is known in the art, operates the gas turbine engine to provide shaft power or thrust that drives an aircraft.

Fuel not needed by metering valve 24 is routed through pressure regulating valve 28 back to main pump 14. Pressure regulating valve 28 allows fuel from the high pressure side of main pump 14 to be returned to the low pressure side of main pump 14 through bypass line—40. For example, main pump 14 operates to provide a steady flow of fuel to nozzles 18 at different operating speeds of the gas turbine engine. Sometimes, such as during steady state cruise conditions of the gas turbine engine, main pump 14 can provide more fuel than is needed by nozzles 18. In such scenarios, metering valve 24 returns unconsumed fuel back through system 10. In one embodiment, pressure regulating valve 28 is spring-biased to a shut or closed position, but is held open in the run mode via pressure P1 from metering valve 24. In another embodiment, metering valve 24 comprises an electronically operated valve, such as a direct drive valve, that is controlled by a control system for the gas turbine engine. In yet another embodiment, metering valve 24 comprises a servo valve that operates based on fuel flow as do actuators 20, which will be described in detail below.

Metering valve 24 is also used to control the position of shut-off valve 26 and pump sharing valve 12 via ports 38 and 36, respectively. Shut-off port 38 is also provided with a low pressure signal in line 42 to allow shut-off valve 26 to open under pressure P2 from metering valve 24 in the run mode. Unloading port 36 is provided with a high pressure signal in line 44 to push pump sharing valve 12 to the run mode position, which affects where flow from servo motor 16 is routed. Additionally, system 10 includes orifices 45A and 45B. In the run mode, the signal in line 42 is saturated by PD through shutoff valve damping orifice 45B, and the signal in line 44 is at P1. In the shutdown mode, the signal in line 42 is switched to P1 which overwhelms shutoff valve damping orifice 45B, and the signal in line 44 is no longer connected to P1, but is now connected to PD via pump sharing valve orifice 45A. Orifices 45A and 45B include openings that permit less through-flow than ports 36 and 38, respectively. Orifice 45B also provides damping to valve 26 to prevent oscillation during operation, as is known in the art.

A circulating flow of fuel from servo pump 16 flows to actuators 20 through servo line 46A. Filter 48 removes contaminants from the fuel before being routed to actuators 20 to avoid formation of blockages. In one embodiment, filter 48 comprises a wash filter, as is known in the art. In one embodiment, actuators 20 comprise servo valves that are operated by fuel flow from servo pump 16. In one embodiment, actuators 20 include butterfly valves that are actuated based on the volume of fuel flow provided by servo pump 16. Actuators 20 regulate airflows within the gas turbine engine operated by nozzles 18. For example, actuators 20 may actuate an active clearance control air valve that provides airflow to change the clearance gap in the turbine section of the gas turbine engine. Such an active clearance control system is described in U.S. Pat. No. 4,069,662 to Redinger, which is assigned to United Technologies Corporation and is incorporated herein by this reference. As another example, actuators 20 may also actuate a bleed valve that controls bleed airflow from the compressor section of the gas turbine engine operated by nozzles 18 for various uses, such as variable vane systems. After being utilized by actuators 20, the fuel returns to the flow of fuel in system 10, such as between source 30 and main pump 14.

Minimum pressure valve 22, which is a spring-actuated valve, ensures that actuators 20 receive a minimum effective pressure to operate. From minimum pressure valve 22, the fuel flows into pump sharing valve 12 through servo line 46B. In one embodiment, pump sharing valve 12 is pushed to the run mode position via fuel pressure in line 44, with a spring-assist. In another embodiment, pump sharing valve 12 comprises an electronically operated valve, such as a direct drive valve, that is controlled by a control system for the gas turbine engine. In yet another embodiment, pump sharing valve 12 comprises a servo valve that operates based on fuel flow as do actuators 20. Share window 50 of pump sharing valve 12 alternatively directs fuel to main line 31 via line 56 or to the inlet of servo pump 16 via line 58. Additionally, pump sharing valve 12 includes sharing port 52 that opens and closes fuel circuit 54 between main line 31 and the outlet of servo pump 16.

In the run mode, pump sharing valve 12 is positioned to close sharing port 52 and fuel circuit 54 under a high pressure signal in line 44 from metering valve 24 and spring force. Positioned as such, window 50 routes a shared flow of fuel from minimum pressure valve 22 to main line 31 through line 56. As such, any excess fuel pressurized by servo pump 16, e.g. fuel not needed by actuators 20, is routed to the output of main pump 14 in main line 31. Thus, servo pump 16 acts to compliment main pump 14 in the run mode. As such, the capacity of main pump 14 can be reduced, as compared to a main fuel pump that operates independently of a servo fuel pump. In the run mode, each of main pump 14 and servo pump 16 operates to provide their respective recipient (e.g. nozzles 18 and actuator 20, respectively) the desired fuel needs, with excess capacity provided to compliment main pump 14. In the shut-down mode, pump sharing valve 12 operates to provide all flow from main pump 14 to actuators 20, as shown in FIG. 1B.

Figure 1B:
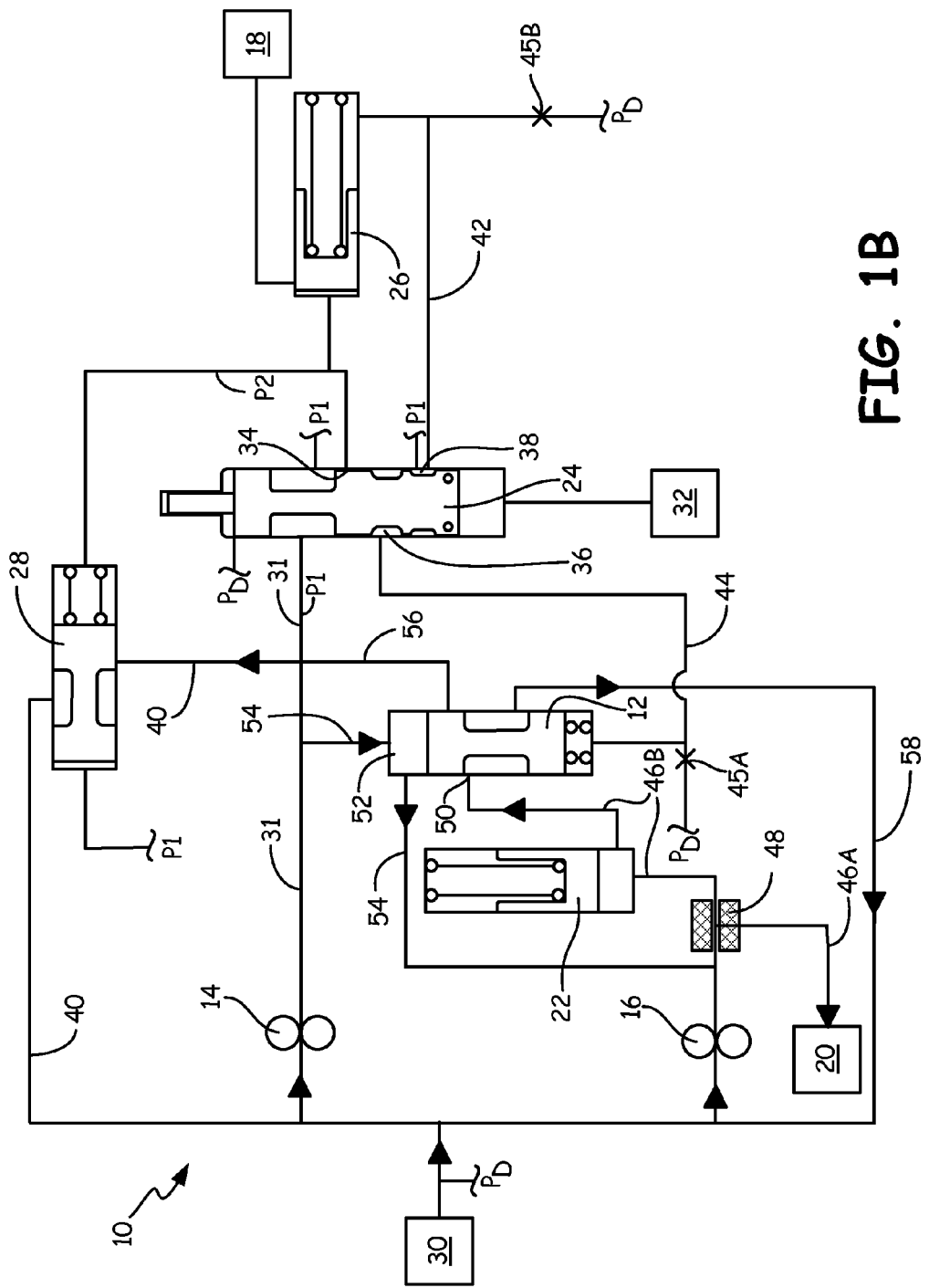
FIG. 1B shows a fuel and actuation system in a shut-down mode wherein a pump sharing valve regulates flow from a main fuel pump and a servo fuel pump to actuators.

FIG. 1B shows fuel and actuation system 10 in a shut-down mode wherein pump sharing valve 12 regulates flow from main pump 14 and servo pump 16 to actuators 20. In the shut-down mode, metering valve 24 is activated via servo motor 32 to close-off fuel flow through window 34 to shut-off valve 26. Shut-off port 38 is provided with a high pressure signal to assist shut-off valve 26 in closing. Shut-off valve 26 also closes under spring force. Simultaneously, with pressure P2 dead-headed, it becomes equal to pressure P1 due to leakage through the metering valve. This forces the pressure regulating valve 28 to close, assisted by a spring force in valve 28. Unloading port 36 is positioned to provide a low pressure signal to pump sharing valve 12, which allows valve 12 to connect share window 50 with line 58. A shared flow of fuel from window 50 is routed to the inlet of servo pump 16 through line 58. Additionally, all output of main pump 14 is routed from main line 31, through port 52 and fuel circuit 54 to join with the output of servo pump 16. As such, actuators 20 receive a combined flow of fuel from servo pump 16 and pump 14 that is sufficient for actuation of actuators 20, even under low flow conditions.

In view of the foregoing, system 10 is configured to ensure adequate flow of fuel to nozzles 18 and actuators 20 under a variety of operating conditions for a gas turbine engine. Under normal, cruise conditions where the gas turbine engine is driving main pump 14 and servo pump 16 at high flow rates, system 10 operates in a run mode where servo pump 16 provides all of the required fuel flow requirements to actuators 20. Any excess capacity of servo pump 16 is routed to supplement fuel flow from main pump 14 to nozzles 18. As such, main pump 14 need not be sized to meet the full demands of nozzles 18. Under shut-down conditions, when the gas turbine engine is not actively powering main pump 14 and servo pump 16, system 10 operates in a shut-down mode where main pump 14 provides additional flow to servo pump 16 to supplement fuel flow to actuators 20.

Low output conditions may occur when the gas turbine engine stalls during flight. Under these conditions, main pump 14 and servo pump 16 are providing lower than normal output due to the significantly reduced operating speed of the gas turbine engine, which is rotating only under power from residual momentum or windmilling conditions. Thus, under stall conditions, servo pump 16 may not, without taking other measures, be able to provide actuators 20 with sufficient fuel for actuation, which may hinder restarting of the gas turbine engine such as by limiting the capability to re-orientate variable vanes. However, with the present system, output flow of main pump 14 supplements output of servo pump 16 to ensure actuators 20 receive sufficient flow to provide actuation and re-start of the engine. The capacity of main pump 14 is large enough, such that even under low flow, windmilling conditions, enough fuel is provided to actuators 20 to enable actuation. The pump sharing valve described herein, therefore, allows the main pump and the servo pump to share fuel flows in various concentrations to provide efficient operation under different engine operating conditions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for an aircraft, the fuel system comprising:
a main pump that receives fuel from a source;
a servo pump that receives fuel from the source;
a metering valve that receives main flow from the main pump, wherein the metering valve includes:
a shut-off port;
a shut-off valve that receives fuel flow from the metering valve and is actuated by the shut-off port, wherein the shut-off port provides:
a low signal pressure to the shut-off valve in a run mode so that the shut-off valve is biased open; and
a high signal pressure to the shut-off valve in a shut-down mode so that the shut-off valve is forced closed;
an actuator that receives fuel flow from the servo pump; and
a pump sharing valve that receives circulating flow from the servo pump and that alternatively directs shared flow to the main flow or an inlet of the servo pump.

2. The fuel system of claim 1 wherein the pump sharing valve further controls fuel through a fuel circuit connecting the main flow with the circulating flow.

3. The fuel system of claim 2 and further comprising:
a pressure regulating valve disposed in a bypass line connecting a high pressure side of the main pump with a low pressure side of the main pump.

4. The fuel system of claim 3 wherein the pressure regulating valve is actuated by output pressure of the metering valve.

5. The fuel system of claim 1 and further comprising:
a boost pump that provides fuel from the source to the main pump and the servo pump; and
fuel nozzles that receive fuel from the shut-off valve.

6. The fuel system of claim 1 and further comprising:
a filter positioned between the servo pump and the actuator; and
a minimum pressure valve positioned between the servo pump and the pump sharing valve.

7. A fuel system comprising:
a first pump;
a first valve that receives outflow from the first pump;
a second valve that receives outflow from the first valve, the second valve further receiving a pressure signal from a first port of the first valve to open and close the second valve;
a second pump;
an actuator that receives outflow from the second pump;
a third valve that receives outflow from the second pump, the third valve further receiving a pressure signal from a second port of the first valve to shift the third valve between two states,
the first state providing outflow of the third valve to inflow of the second pump;
the second state providing outflow of the third valve to outflow of the first pump;
a fuel circuit connecting outflow of the first pump to outflow of the second pump; and
a fourth valve disposed in a bypass line to fluidly connect outflow of the first pump with inflow of the first pump, wherein the fourth valve is actuated by output pressure of the first valve.

8. The fuel system of claim 7 wherein the third valve controls flow through the fuel circuit.

9. The fuel system of claim 7 and further comprising:
a third pump that provides input to an inlet of the first pump and an inlet of the second pump; and
fuel nozzles that receive fuel from the second valve.

10. The fuel system of claim 7 and further comprising:
a fifth valve positioned between the second pump and the third valve.

11. A fuel system for an aircraft, the fuel system comprising:
a main pump that receives fuel from a source;
a servo pump that receives fuel from the source;
a metering valve that receives main flow from the main pump, wherein the metering valve includes:
a shut-off port; and
an unloading port;
a shut-off valve that receives fuel flow from the metering valve and is actuated by the shut-off port;
an actuator that receives fuel flow from the servo pump; and
a pump sharing valve that receives circulating flow from the servo pump and that alternatively directs shared flow to the main flow or an inlet of the servo pump, wherein the pump sharing valve further controls fuel through a fuel circuit connecting the main flow with the circulating flow, and wherein the unloading port actuates the pump sharing valve, and wherein the unloading port provides:
a high signal pressure to the pump sharing valve in a run mode so that the pump sharing valve provides the shared flow to the main flow; and
a low signal pressure to the pump sharing valve in a shut-down mode so that the pump sharing valve provides the shared flow to the inlet of the servo pump.

12. The fuel system of claim 11 wherein the pump sharing valve has a sharing port that selectively connects the fuel circuit to the main flow, and wherein the high pressure signal closes the sharing port to prevent flow between the main flow and the fuel circuit, and the low pressure signal opens the sharing port to allow flow from the main flow to the fuel circuit.

* * * * *